Nov. 22, 1949 F. J. HORTON Re. 23,169

WIRE BENDING MACHINE

Original Filed Jan. 21, 1938 9 Sheets-Sheet 1

INVENTOR
Frank J. Horton.
BY
Harness, Dickey & Pierce.
ATTORNEYS.

WIRE BENDING MACHINE

Original Filed Jan. 21, 1938 9 Sheets-Sheet 2

INVENTOR
Frank J. Horton.
BY
Harness, Dickey & Pierce.
ATTORNEYS

WIRE BENDING MACHINE

Original Filed Jan. 21, 1938 9 Sheets-Sheet 3

INVENTOR
Frank J. Horton.
BY
Harness, Dickey & Pierce.
ATTORNEYS.

Nov. 22, 1949 F. J. HORTON Re. 23,169

WIRE BENDING MACHINE

Original Filed Jan. 21, 1938 9 Sheets-Sheet 4

INVENTOR.
Frank J. Horton.

BY
Harness, Dickey & Pierce.
ATTORNEYS.

Nov. 22, 1949 F. J. HORTON Re. 23,169
WIRE BENDING MACHINE
Original Filed Jan. 21, 1938 9 Sheets-Sheet 5
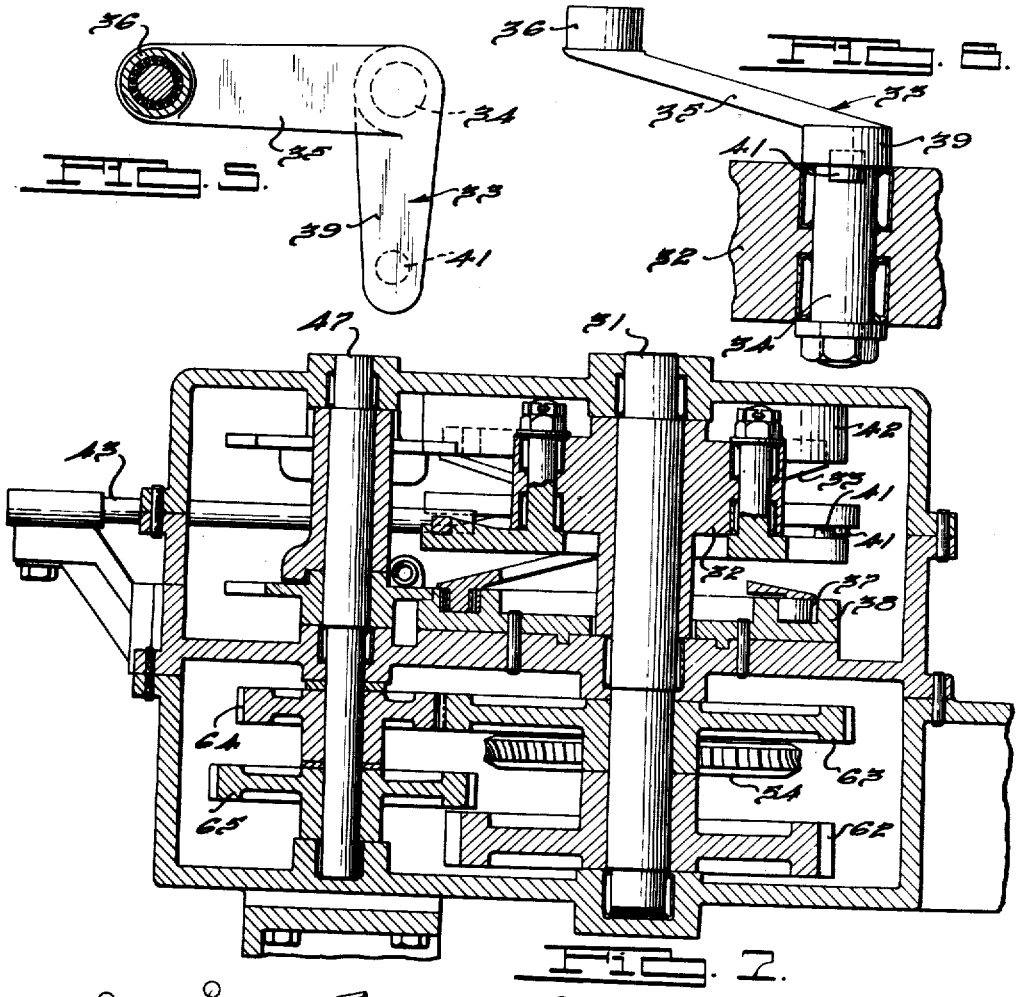
FIG. 5.
FIG. 6.
FIG. 7.
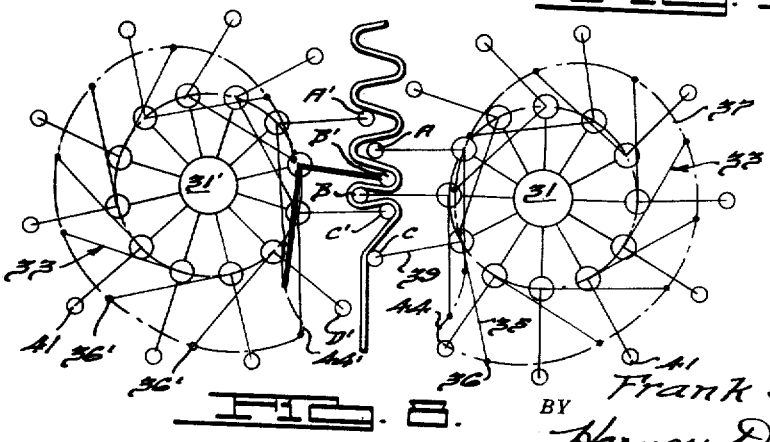
FIG. 8.
INVENTOR
Frank J. Horton.
BY
Harness, Dickey & Pierce
ATTORNEYS.

Nov. 22, 1949

F. J. HORTON

Re. 23,169

WIRE BENDING MACHINE

Original Filed Jan. 21, 1938

9 Sheets-Sheet 6

INVENTOR
Frank J. Horton.
Harness, Dickey & Pierce.
ATTORNEYS.

WIRE BENDING MACHINE

Original Filed Jan. 21, 1938 9 Sheets-Sheet 7

WIRE BENDING MACHINE

Original Filed Jan. 21, 1938 9 Sheets-Sheet 8

INVENTOR
Frank J. Horton.
BY
Hamess, Dickey & Pierce.
ATTORNEYS.

WIRE BENDING MACHINE

Original Filed Jan. 21, 1938 9 Sheets-Sheet 9

INVENTOR
Frank J. Horton.
BY
Harness, Dickey & Pierce.
ATTORNEYS.

Reissued Nov. 22, 1949 Re. 23,169

UNITED STATES PATENT OFFICE 23,169

WIRE BENDING MACHINE

Frank J. Horton, Decker, Mich., assignor to No Sag Spring Company, Detroit, Mich., a corporation of Michigan Original No. 2,160,020, dated May 30, 1939, Serial No. 186,015, January 21, 1938. Application for reissue March 31, 1949, Serial No. 84,499

24 Claims. (Cl. 140—105)

My invention relates to spring forming machines and particularly to a machine for forming sinuous spring elements from wires, cutting the springs to predetermined lengths, forming the ends to desired shape, and stressing the spring to provide a set therein on an arc of predetermined radius.

In my co-pending application, Serial No. 35,705, filed August 12, 1935, and issued January 30, 1940, as Patents Nos. 2,188,406 and 2,188,407, I illustrated a unit machine for bending wire into sinuous form, setting the spring on a small arc and cutting the resulting spring elements into predetermined lengths. The machine, while operating in a very satisfactory manner, is limited in its speed of operation. The device embodying the invention of the present application, while forming a spring in the same manner as the structure of the abovementioned copending application, is capable of materially greater speed of production and has the additional feature of performing the ends of the spring sections at the time of separation.

The machine, in general, embodies a plurality of cam arms carried about spaced centers and arranged to move alternately across the path of the wire to bend it first in one direction and then in the other to form the wire into sinuous shape. The sinuous spring strip thus formed is fed through rollers to provide a set thereto on a predetermined small radius. The strip is then fed through a cutting device, which severs the strip into predetermined lengths and at the same time forms the end of the severed elements to a desired shape. Spring strips of predetermined length are provided, having the ends predeterminedly formed to be locked to securing elements which retain the strips on an arc of greater radius than the radius of the arc on which the strip is initially set.

Accordingly the main objects of my invention are: to provide a wire forming machine which continuously bends wire into sinuous form, provides an inherent set therein on an arc of small radius, cuts the formed wire into predetermined lengths, and forms the ends of the lengths into predetermined shape; to provide spaced arbors with a plurality of cam operated arms which alternately engage and bend a wire in opposite direction as it passes therebetween; to rotate a plurality of arms about spaced centers and operate the arms by means of cams to alternately pass across the path of a wire to be formed into a sinuous spring; to provide a plurality of rolls operating in synchronism with the forming elements to stress the sinuous spring material when providing a set therein on a small arc; to feed the strip of material through a cutting head which may be adjusted to sever the strip to any desired length; to have bending means associated with the cutting dies to form the ends of the wire so as to be retained by a clip; to synchronize the devices of the machine for forming, setting, shearing and end bending to permit the wire to be fed in one end of the machine and removed as spring elements from the other end thereof; and, in general, to provide a machine which is rugged in construction, capable of high speed operation and which is economical of manufacture and use.

Other objects and features of novelty of my invention will be either specifically pointed out or will become apparent when referring, for a better understanding of my invention, to the following description taken in conjunction with the accompanying drawings, wherein:

Fig. 5 is a plan view, partly made in section of one of the bell cranks illustrated in the structure shown in Fig. 4;

Fig. 6 is a view in elevation of the structure illustrated in Fig. 5, with the supporting element in section;

Fig. 7 is an enlarged sectional view of the structure illustrated in Fig. 3 taken on the line 7—7 thereof;

Fig. 8 is a diagrammatical view of the bell cranks illustrated in Figs. 5 and 6, showing their positions when operating to form wire into sinuous springs;

Figure 1:
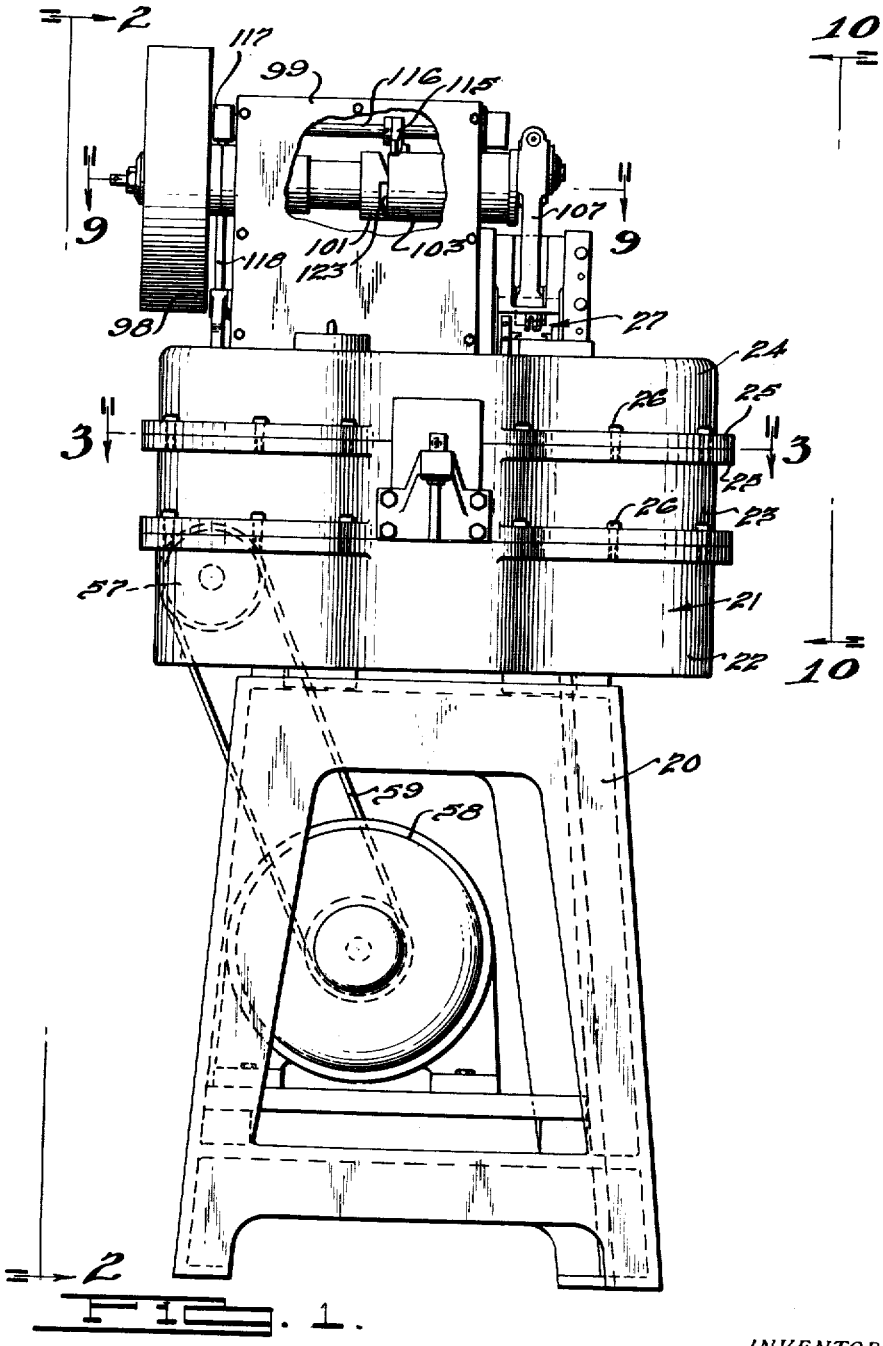
Figure 1 is a view, in elevation, of a machine embodying features of my invention.

The machine for forming, coiling and severing the sinuous springs embodies a standard 20 having a housing 21 thereon, in which the wire forming elements are mounted. The housing 21 comprises three parts, a bottom section 22, a central section 23, and a cover 24. Flanges 25 are provided on the two sections and cover to provide means by which the sections are joined together by a plurality of bolts 26. On the left hand end of the standard 20, as viewed in Fig. 2, a coiling device 29 and a cut-off mechanism 27 is mounted. The sinuously formed spring strip 28 is passed through the coiling device 29 to provide a set in the strip on an arc of small diameter, after which the strip passes through the cut-off mechanism 27 where it is cut into sections with the ends formed into desired shape.

Figure 2:
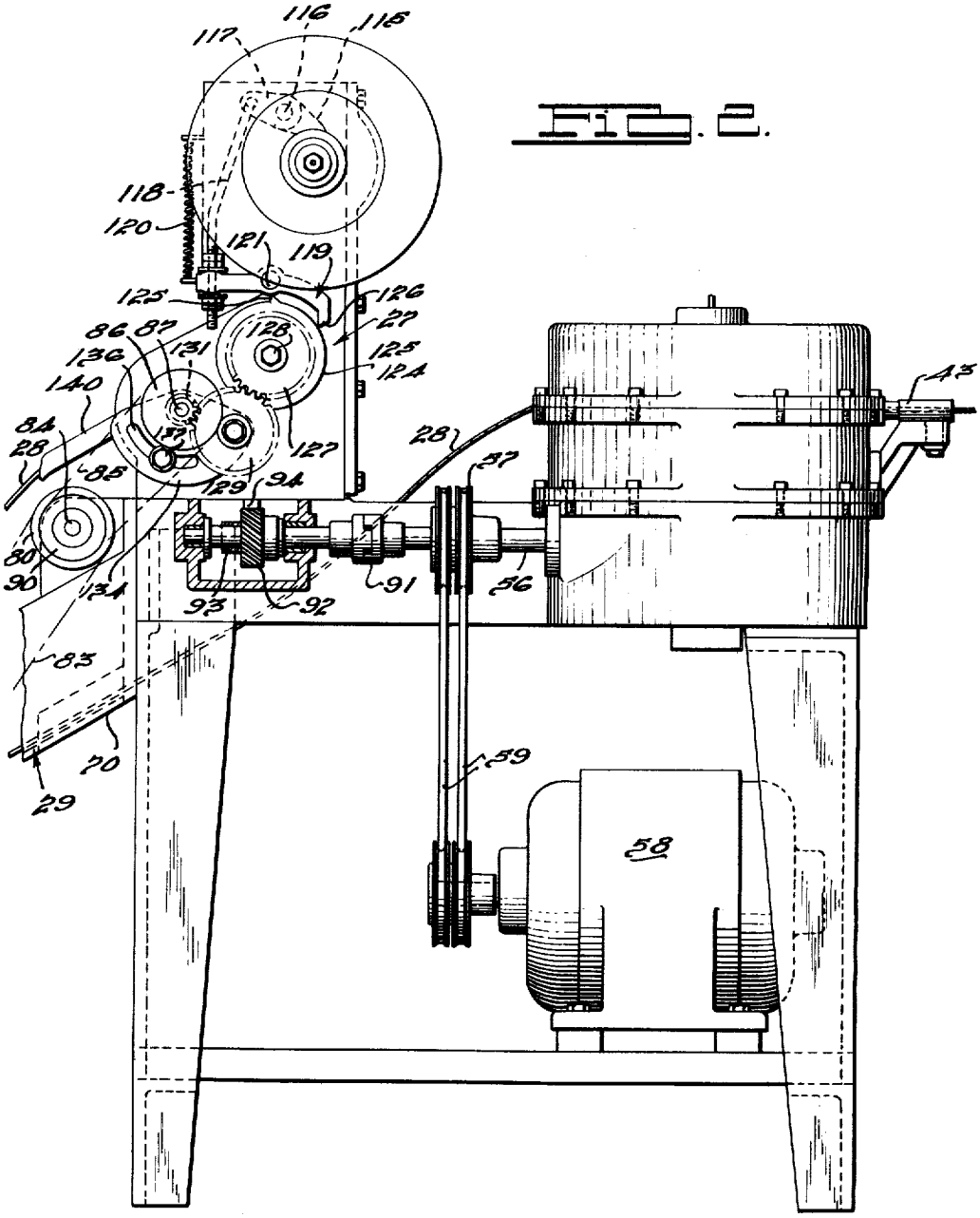
Fig. 2 is a side view, with a part in section, of the structure illustrated in Fig. 1 as viewed from the line 2—2 thereof.

Referring more particularly to Figs. 1 and 2, the housing 21 has a pair of spaced, vertical shafts 31, to which hubs or circular plates 32 are secured in driving relation. Each plate is provided with a plurality of bell cranks 33 having a stud 34 thereon which are journalled in the plates 32 near the peripheral edge thereof. The bell cranks 33 and plates 32 are illustrated more clearly in Figs. 5, 6 and 7. One arm 35 of the bell cranks 33 is provided with a bearing roller 36 which operates in a cam slot 37 in a cam plate 38. An arm 39, mounted at right angles to the arm 35 of the bell crank 33, is provided with a pin 41 about which the wire is bent.

The plates 32 are mounted in different horizontal planes with the bell cranks 33 of one plate mounted in reverse or up-side down relation to those on the other plate. Similarly, the cam plates 38 are mounted in the reverse relation, one having the cam slot 37 presenting upwardly, the other having the cam slot presenting downwardly—the position of the plates 32 on their respective shafts being such as to permit the wire to be formed to pass between the arms 39 of the respective plates. In the space thus provided the pins 41 of the arm 39 extend to engage and form the wire into sinuous shape as it is advanced.

Figure 4:
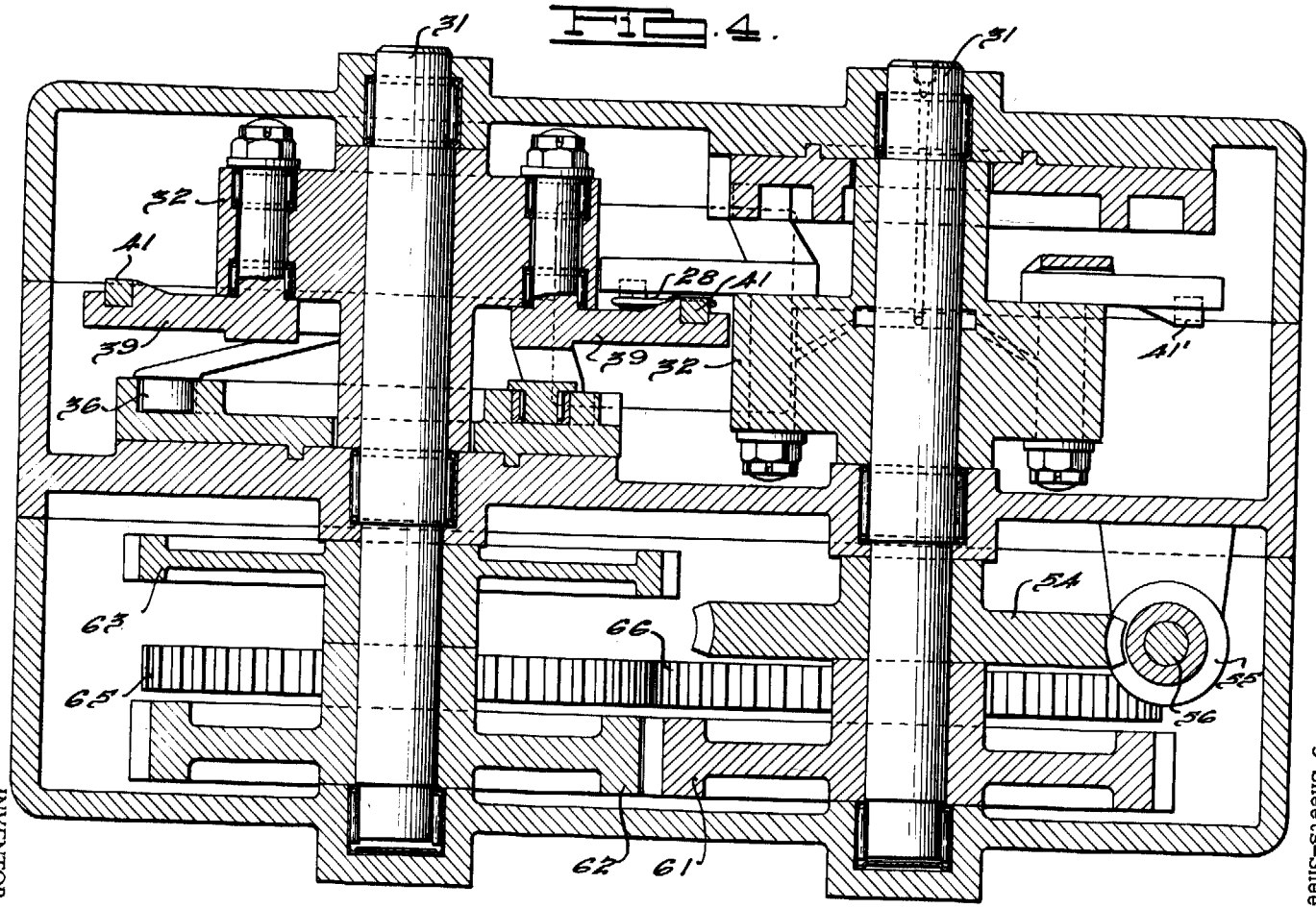
Fig. 4 is a sectional view of the structure illustrated in Fig. 3, taken on the line 4—4 thereof.
Figure 9:
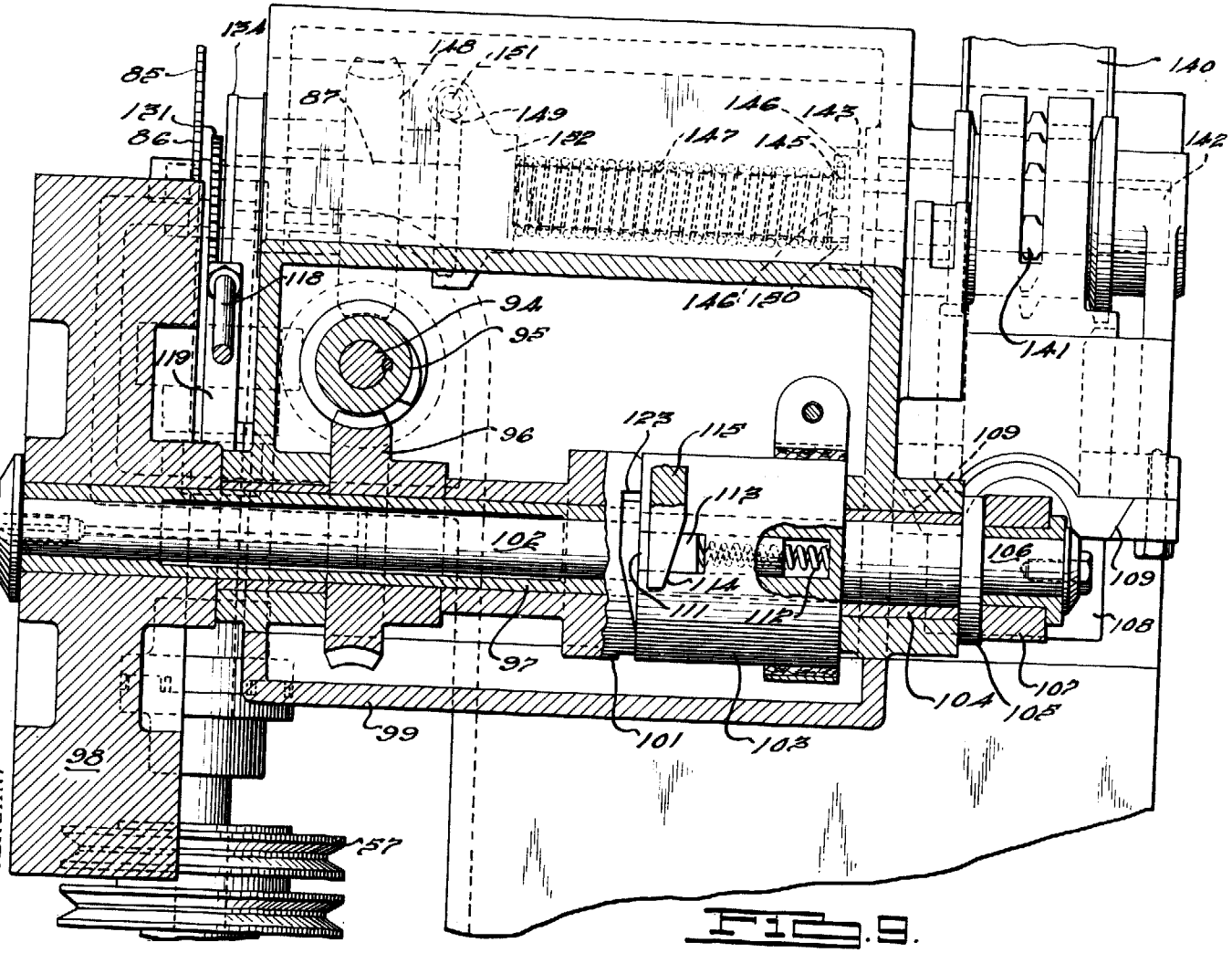
Fig. 9 is an enlarged sectional view of the structure illustrated in Fig. 1, taken on the line 9—9 thereof.

The spacing of the shafts 31 from each other is such as to permit the arms to extend into the space therebetween in overlapping relation to have the pins 41, disposed about each shaft, move beyond the center line between the shafts. This is clearly illustrated in the central portion of the structure shown in Fig. 4. The pins alternately advance and form the wire, bending it first toward one shaft, then toward the other into sinuous form.

Figure 3:
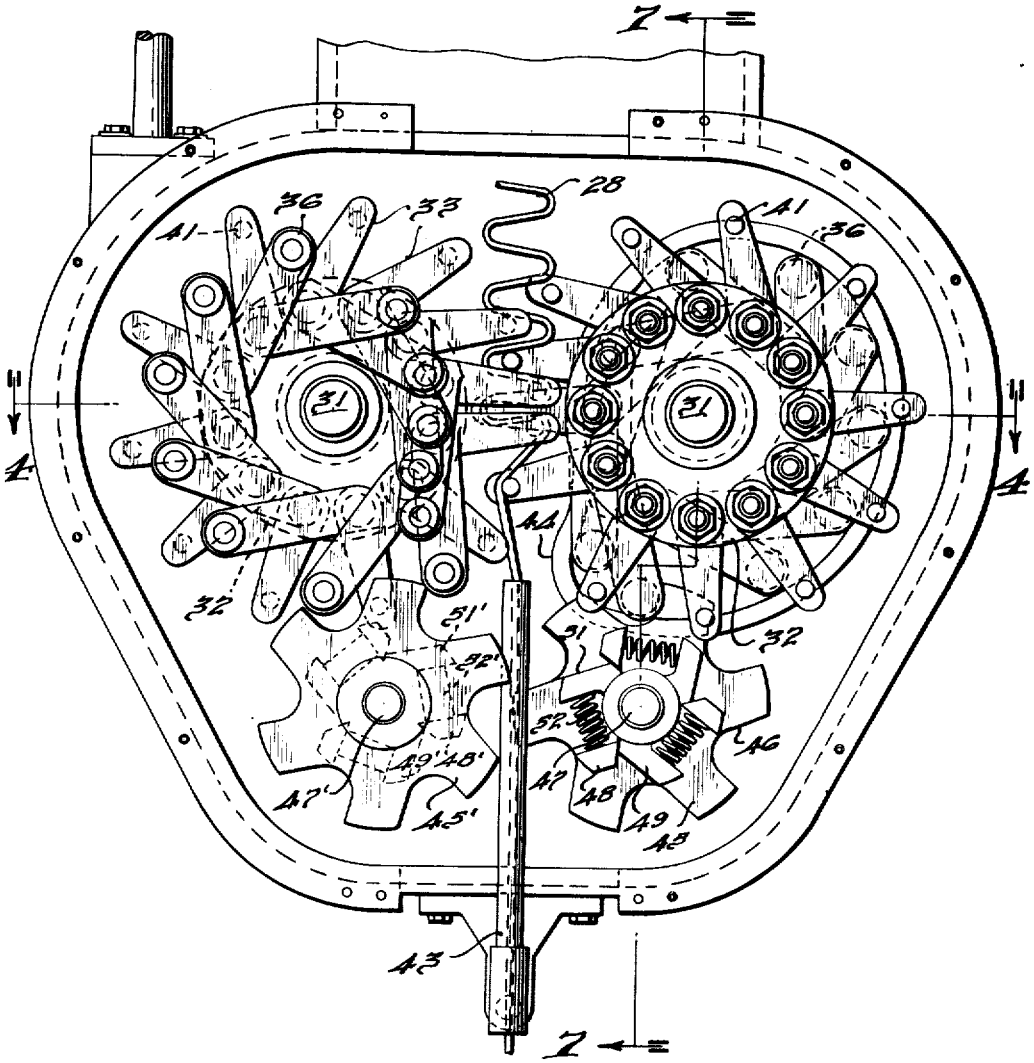
Fig. 3 is a sectional view of the structure illustrated in Fig. 1, taken on the line 3—3 thereof.

Referring to Fig. 8, I have illustrated the shape of the cam slots 37 and the position of the bell cranks 33 diagrammatically. The rollers 36 on the ends of the bell cranks 33 follow the cam slots 37 as the plates 32 rotate with the driven shafts 31. A wire is drawn through a tube 43 to a position between the arms 39 on the two plates and centrally between the shafts 31, as illustrated more clearly in Fig. 3. The elements of the forming device on the right of the wire, as viewed in Fig. 8, are indicated in plain numerals and letters while those of the forming device on the left of the wire have primed numerals and letters. It will be noted that pins A and A' are moving out of the formed wire during the synchronized rotation of the shafts 31 and 31'. The pins A and A' completed the bending of a convolution in the wire, as has also the pin B'. The pin C' is completing the bending of the wire about the pin B as pin C is deflecting the wire and commencing to bend the wire about the pin C'. Pin D' is moving toward the wire to next engage and bend the wire about the pin C, while pin D will then follow to bend the wire about the pin D'. All of the pins advance in sequence in this manner to engage and form the wire about the pin which prior to that time bent the wire about a preceding pin in the opposite direction.

From Fig. 8 it will be noted that the cam slots 37 have sharp lips 44, about which the rollers 36 must travel when the bell cranks 33 are driven by the plates 32 from the shafts 31. It will be noted that the arms 35 assume a position substantially tangential to the plates 32 during the rotation of the plates and difficulty was experienced in having the rollers advance in the cam slots 37 about the lip portions 44 thereof. To overcome the difficulty I have provided kicker plates 45 having notches 46 therein, which engage and advance the rollers 36 as they approach the lip portions 44, to aid in moving the rollers to and around the lip portions. The plates are mounted to rotate on shafts 47 and 47' and are provided with bosses 48 and 48'. Hubs 49 and 49' are mounted on the shafts 47 and 47' in driving relation thereto having lugs 51 and 51' respectively, provided thereon, which lugs are interconnected by coil springs 52 and 52' to the bosses 48 and 48' of the plates. The notched plates 45 and 45' engage the ends of the rollers 36 and 36' respectively as they advance in the cam track 37 and force the rollers beyond the lips 44 of the cam slots. The shaft 31' is driven through a worm wheel 54 by a worm 55 mounted on a shaft 56 containing pulleys 57 which are driven by a motor 58 through belts 59. The shaft 31 is connected in driving relation with the shaft 31' by a pair of gears 61 and 62 keyed to the two shafts. A gear 63 on the shaft 31 is mounted in mesh with a gear 64 on the shaft 47. A gear 65 on the shaft 47 is in mesh with a gear 66 on the shaft 47' and through the various gears above set forth, the four shafts 31, 31', 47 and 47', are driven in synchronism.

Figure 11:
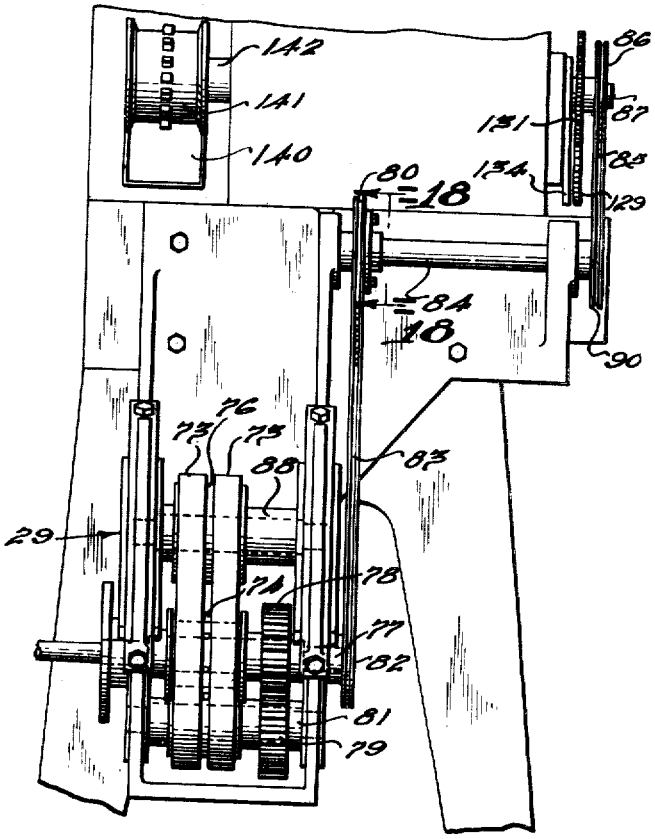
Fig. 11 is an enlarged broken view of the coiling device mounted on the rear face of the machine illustrated in Fig. 1.
Figure 12:
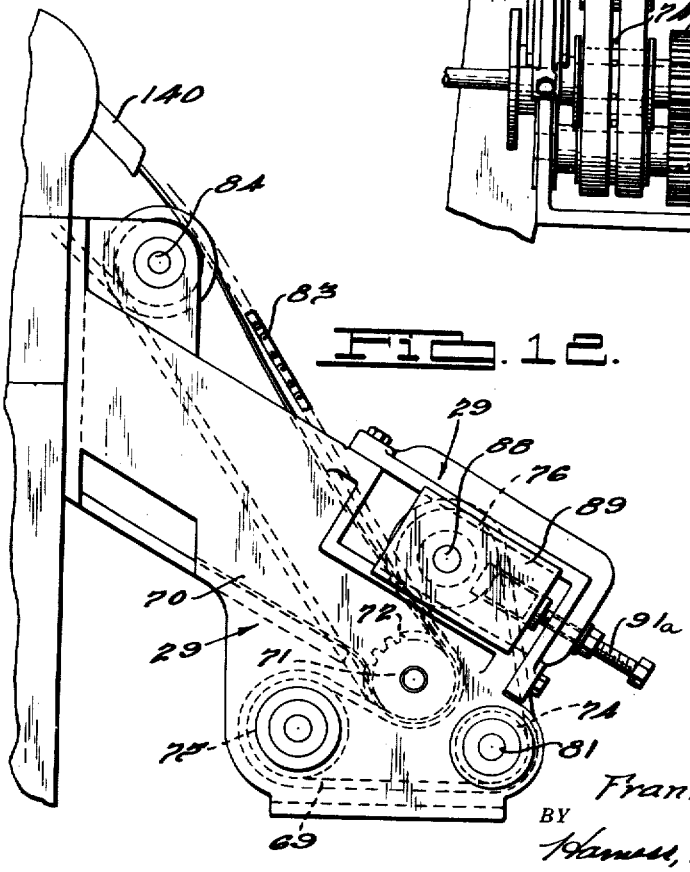
Fig. 12 is a side view in elevation of the structure illustrated in Fig. 11, and is a continuation of the broken portion of the machine as illustrated in Fig. 2.
Figure 13:
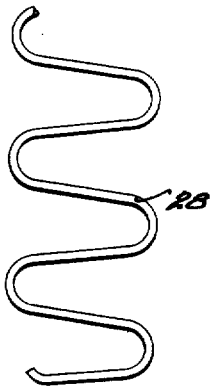
Fig. 13 is a broken plan view of a section of the strip formed in the machine illustrated in the above described figures.
Figure 14:
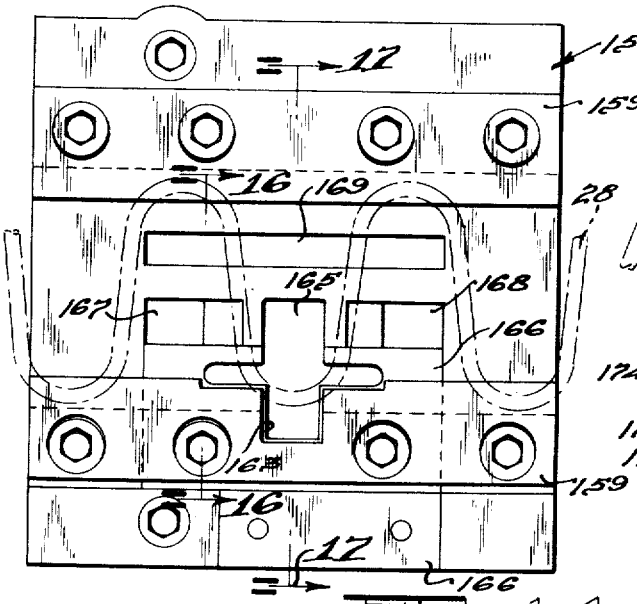
Fig. 14 is a plan view of the lower cutting and end forming dies as viewed from line 14—14 of Fig. 10.
Figure 15:
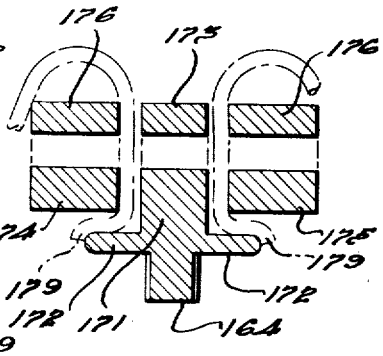
Fig. 15 is an enlarged sectional view of the structure illustrated in Fig. 10, taken on the line 15—15 thereof.
Figure 16:
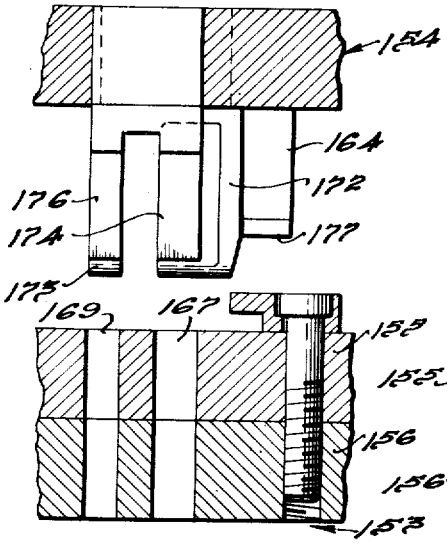
Fig. 16 is a sectional view of the structure illustrated in Fig. 14, taken on the line 16—16 thereof.

The sinous spring strip formed in the device so far described next passes into the coiling device 29, illustrated in Figs. 2, 11 and 12, wherein the strip is given a set on an arc of predetermined curvature. The strip is conducted in a trough 70 about a sprocket 71, the teeth 72 of which engage the convolutions of the strip to progressively advance the strip through the device. A pair of belts 73, of the link type, have their back faces disposed about the plane hubs on each side of the teeth 72 of the sprocket 71. The front teeth of the belts are in engagement with the teeth of the sprockets 74, 75 and 76, and are driven by the sprocket 74. A shaft 77 carrying the sprocket 71 has a gear 78 keyed thereto in mesh with a gear 79 on a shaft 81 carrying the sprocket 74. A sprocket 82 on the shaft 77 is driven by a chain 83 from a sprocket 80 on the shaft 84. A second sprocket 90 on the shaft 84 is driven by a chain 85 from a sprocket 86 on a shaft 87. The shaft 87 is driven from the shaft 56 in a manner to be explained hereinafter. The shaft 88, carrying the sprocket 76, has its end journaled in slides 89 which are adjustable by screws 91a for tensioning the belts 69 about the sprocket 71.

The tension on the belts is regulated in this manner to cause the sinuous formed spring to closely follow the radius of the sprocket 72 as it is advanced thereabout and to become set on a radius slightly larger than that of the sprocket. After passing the sprocket 71 the sinuous spring is advanced into the cut-off and end-forming device 27 where it is cut in sections of predetermined length and where the ends of the section so cut are bent at an angle to the severed end wires.

The cut-off and end-forming mechanism 27 operates in a similar manner to that of the above described co-pending application. The shaft 56 drives through a coupling 91 a helical gear 92 having the teeth thereof disposed at a 45° angle. The gear 92 drives a similar helical gear 93 disposed at right angles thereto for driving a vertical shaft 94 in rotation. The upper end of the shaft 94 carries a worm 95 which operates a worm wheel 96 for driving a sleeve 97 in rotation. The sleeve 97 has a fly-wheel 98 secured to the end projecting outside of a casing 99 which encloses the worm 95, worm wheel 98 and other mechanism. A ratchet wheel 101 is secured to the sleeve 97 in driving relation therewith. A shaft 102 extends through and is bearinged within the sleeve 97 and is keyed to a drum 103 having a diameter substantially the same as that of the ratchet wheel 101. The opposite end of the shaft 102 is journaled in a bearing 104 and has a head 105 outward of the bearing from which a stud 106 projects in off-center relation to the center of the shaft.

A connecting rod 107 is supported on the stud 106 and is pivotally secured to a slide 108 which operates in dovetails 109. The drum 103 has a plunger 111 therein which is urged outwardly toward the ratchet wheel 101 by a spring 112. A cam projection 113 extends beyond the surface of the drum 103 and is engageable by a cam surface 114 on a finger 115. The finger 115 is carried on a shaft 116 which is operated by an arm 117 through a link 118 connected to a lever 119 which is pivoted at 121 exterior of the casing 99. When the finger 115 is raised, due to the counterclockwise movement of the shaft 116, the cam projection 113 is disengaged from the surface 114 permitting the plunger 111 to move beyond the end of the drum 103 under the bias of the spring 112.

The plunger projects into a recess 123 in the ratchet wheel 101 and provides a driving connection between the drum 103 and the ratchet wheel. In this manner, at a predetermined point in the operation of the machine, a drive connection is provided from the worm 95 and worm wheel 96 to rotate the head 105 and operate the connecting rod 107 to move the slide 108 in reciprocation. The raising and releasing of the finger 115 is instantaneous so that it immediately returns to its initial position to intercept the cam projection 113 to retract the plunger 111 at the end of a single revolution of the drum 103 to thereby disconnect the drum from the ratchet wheel 101 after producing a single reciprocation of the slide 108.

For operating the lever 119, I have provided an index wheel 124 having a sharp index finger 125 thereon. The end 126 of the lever 119 is disposed in the path of the finger 125 which operates the lever 119 in a counterclockwise direction about its pivot 121. This movement of the lever 119 moves the link 118 downwardly and rotates the arm 117, the shaft 116 and the finger 115 in a counterclockwise direction. The end 126 of the lever 119 immediately passes over the index finger 125 and the lever 119, link 118, arm 117, shaft 116, and the finger 115 quickly return to their original positions under the bias of the spring 120.

The index plate 124 is driven by a changeable gear 127 which is secured to a stud 128 to which the plate 124 is keyed. The gear 127 is driven from a gear 129 and a pinion 131, the latter of which is keyed to the shaft 87. The gear 129 is pivotally mounted on a sector 134 which may be swung about the shaft 87 to permit the gear 129 to be moved from and toward the gear 127 while maintaining meshed relation with the gear 131. The sector 134 is provided with a slot 136 through which a bolt 137 extends for clamping the sector in desired position. By this means, the gear 127 may be removed and a larger or smaller gear mounted on the stud 128 in mesh with the gear 129. By changing the gear 127, the length of the section of spring cut from the sinuous strip 28 may be adjusted.

The spring is fed from the coiling device 29 through a trough 140 to a sprocket 141. The sprocket 141 is mounted on a stub shaft 142 having a collar 143 on its inner end. The shaft 87 has its inner end bearinged in the collar 143 of the shaft 142, and its outer end extending through the casing 99 for supporting the sprocket 86 and pinion 131. A drive connection is provided between the shaft 87 and stub shaft 142 through a spring 147 disposed about the shaft 87. A pin 145 in the shaft 87 projects into a sector slot 146 of the collar 143 to limit the degree of movement therebetween. The shaft 87 has a worm wheel 148 mounted thereon in driving relation thereto. The worm wheel 148 is driven by a worm, similar to the worm 95, mounted on the lower portion of the shaft 94 so that the worm wheel 148 is driven in synchronism with the worm wheel 96. The worm wheel 148 has a worm wheel 149 thereon engaged by a worm 151 journaled in a casting 152 in which one end of the spring 147 is secured. Through adjustment of the worm 151 about its wheel 149 any amount of tension in the spring 147 may be provided. The opposite end 150 of the spring 147 is secured in the collar 143 and the tension in the spring retains the pin 145 against that side of the slot 146 opposite to the direction of rotation of the collar 143.

When the slide 108 is moved downwardly the advancement of the sinuous spring about the sprocket 141 is preferably arrested and this may occur due to the holding force of the wire acting against the teeth of the sprocket 141 for preventing rotation of the collar 143 without interrupting the continued rotation of the worm wheel 148. The shaft 87 will continue to rotate further tensioning the spring 147 and moving the pin 145 in the slot 146 in the collar 143. Immediately upon the release of the sprocket 141, the sprocket and collar 143 will be rotated forwardly by the spring until the pin 145 is again in its original position against the side of the slot 146.

Referring to Figs. 10, 14, 15, 16 and 17, I have illustrated the stationary and movable cutting and forming dies 153 and 154 respectively, which cuts a section out of a convolution of the wire strip and bends the remaining ends of the convolution at an angle. By bending the ends in this manner, holding clips employed on the ends for anchoring the ends on a frame will be locked on the ends by the bent portions. The stationary dies 153 shown in plan view in Fig. 14 embody a base plate 155 secured to a supporting plate 156 which is attached to a base 157 of the cut-off and end-forming device 27. A slot 158 is provided in the base plate 155 in which stripper bars 159 are disposed, having an outwardly projecting lip 161 forming a passage 162 through which the spring strip is fed by the sprocket wheel 141.

Figure 17:
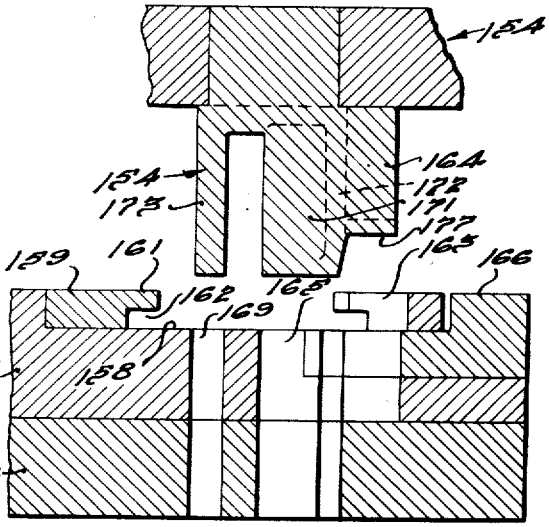
Fig. 17 is a sectional view of the structure illustrated in Fig. 14 taken on the line 17—17 thereof.

The strip 159 on the right of the base plate 155, as viewed in Fig. 17, has a cut-out portion 163 for receiving the shearing blade 164 of the movable die 154. An aperture 165 in extension of the opening 163 is provided in the plate in the shape of the cutting and bending die for receiving and guiding the die during its downward movement. A hardened plate 166 is mounted on the base plate 155 to cooperate with the hardened blade 164 for effecting the shearing operation. The plate 166 is made of extremely hard material to withstand the cutting operation and may be renewed when worn without the necessity of renewing the plate 155. The stripper bar 159 on the right of the plate, as viewed in Fig. 17, is adjustable laterally to regulate the width of the space 162 through which the strip is advanced to conform to the width of the strip produced by pins 41 of the bell cranks 33. By changing the size of the pins the width of the wire produced may be regulated. The plate 155 is also provided with apertures 167 and 168 for receiving anvils about which the wire is bent. Another aperture 169 is provided rearwardly of the apertures 167 and 168 employed for receiving projections on the anvils and cutting die, which functions to retain the portion of the wires opposite from the end from which a section is cut from moving laterally during the bending operation.

The movable portion 154 of the cutting and bending die embodies a central element having the blade 164, the body 171, and the laterally extending downwardly converging wings 172 which produce the outward deflection of the wire during the downward movement of the die to effect the bending. The die is also provided with a rearwardly spaced lug 173 of a width substantially that of the body portion 171.

Figure 10:
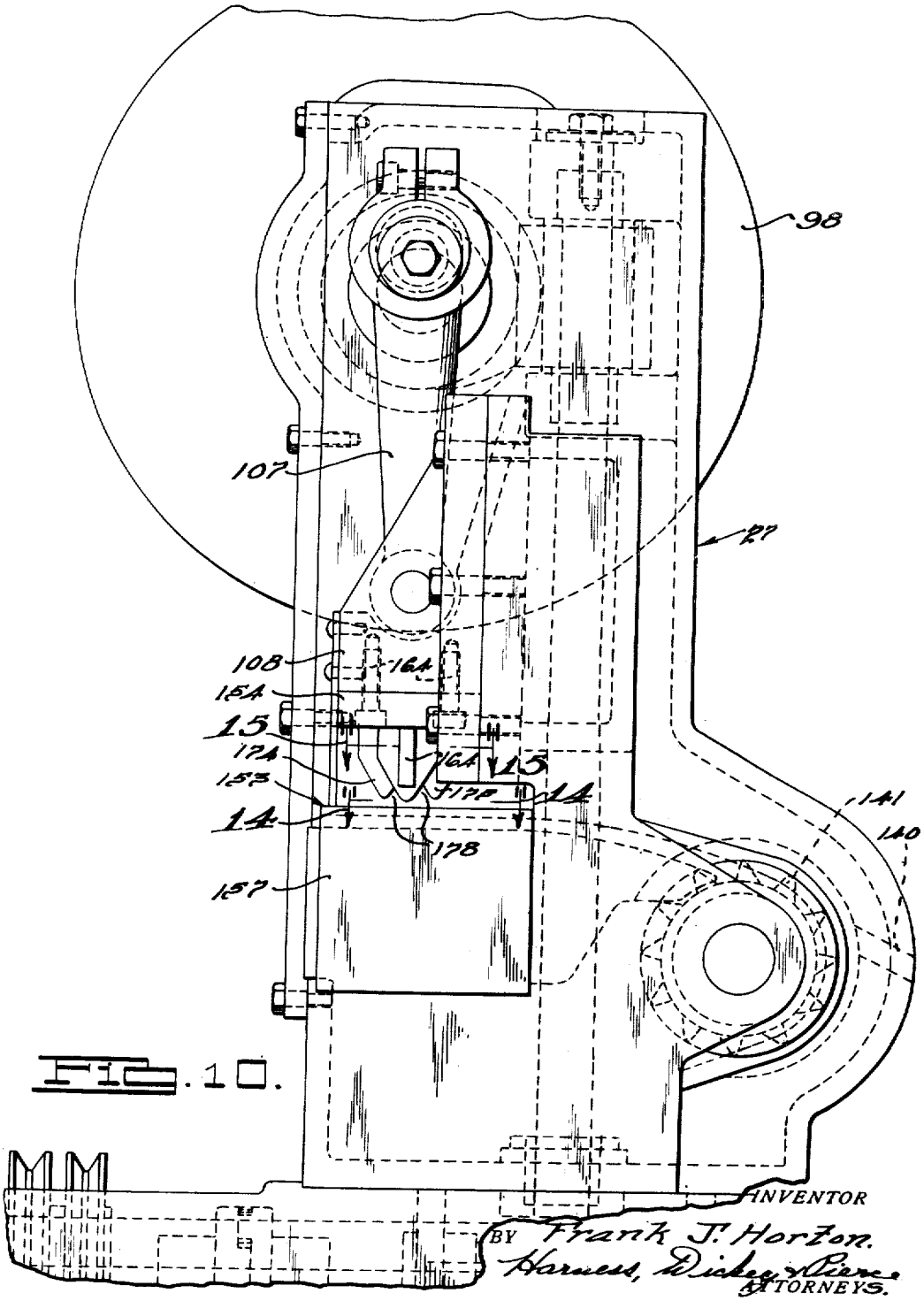
Fig. 10 is an enlarged view of the upper portion of the structure illustrated in Fig. 1 as viewed from the line 10—10 thereof.

Laterally of the body portion, anvils 174 and 175 are provided which are also downwardly converging as illustrated in Fig. 10. Rearwardly of the anvil portions 174 and 175, lugs 176 are disposed aligned with the lug 173 of the body portion 171. The anvils 174 and 175 are spaced laterally from the body portion 171 a sufficient distance to receive the wire from which the strip is constructed. The lateral spacing of the lugs 176 from the central lug 173 converges upwardly for holding the rear portion of the wires therebetween during the bending operation.

When the slide 168 is moved downwardly the adjacent wires of a convolution of the strip are engaged between the ends of the anvils 174 and 175 and the end 177 of the wings 172 in the spaces 178 provided therebetween, as illustrated in Fig. 10. The wires are also disposed in the spaces between the lug 173 and lugs 176. As the slide moves downwardly the cut-off mechanism 164 severs a section from the convolution held in this manner and through the further downward movement, the wings 172 bend the severed ends 179 laterally about the anvils 174 and 175 to provide a permanent set and deflection to the ends. During the bending operation, the rear portions of the adjacent wires are held against lateral movement between the lugs 176 and the central lug 173. In this manner, through the single downward movement of the slide, a section of the spring strip is severed and the severed ends are bent at an angle. The bent ends prevent the end wires of the sections from slipping from cleats which are employed for retaining the sections on a frame. By selecting the proper diameter of the gear 121 the length of section severed from the strip is adjusted so that any desired length of strip may be severed during the continued operation of the machine.

The machine herein illustrated and described operates to bend a wire first in one direction and then in the other to progressively form a sinuous spring strip of continuous length. The strip is advanced through a coiling roll to provide a set on a predetermined diameter so that a section of the spring assumes the shape of a circle or a portion thereof. The strip passes from the coiling roll to the cut-off and end-forming dies through which it is advanced in timed relation to have a section cut therefrom of predetermined length. The length of the section may be changed through changing the diameter of a driving gear. The severing of the section and the bending of the severed ends are effected through a single downward movement of a slide by dies which engage the adjacent wires of a convolution. A section is first cut from the curved end portion after which, upon the further downward movement of the movable die, the two remaining ends of the portion are bent laterally about the adjacent die anvils. The machine has the parts thereof so constructed as to permit rapid operation and a maximum production.

Figure 18:
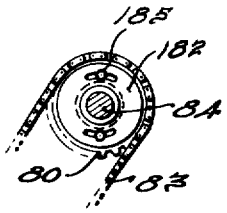
Fig. 18 is a broken sectional view of the structure illustrated in Fig. 11 taken on the line 18—18 thereof.

As the wire passes through the machine, the pins 41 are so disposed and moved to bend the wire beyond parallel relation, as illustrated by the section disposed about pin B of Fig. 8. When released, the convolutions tend to spread, but not to as great a degree as occurs when the wire is bent to less than parallel relation. A more resilient spring strip is provided in this manner, and one which lends itself readily to stretching to a desired size. Referring to Fig. 18, I have illustrated the sprocket wheel 80 as being rotatable relative to the shaft 84. The wheel 80 is secured in driving relation to the shaft 84 by the hub 182 through a slot and bolt connection 185. By adjusting the sprocket relative to the hub, the chain 83 is advanced to turn the sprocket 74 and 72 to thereby stretch the spring strip to provide a slight elongation thereto resulting in a change in the length of the sections cut from the strip. Through the shifting of the sprocket 80 relative to the hub 182, the proper length of section is obtained. After the sections are formed in the manner above set forth, they are preferably heated in an oven to have the wire thereof normalized.

While I have illustrated and described but a single embodiment of my invention, it will be apparent to those skilled in the art that various changes, omissions, additions, and substitutions may be made therein without departing from the spirit and scope of my invention, as set forth in the accompanying claims.

What is claimed is:

1. In a machine for bending wire into sinuous form, of a pair of spaced parallel spindles, means for driving said spindles in rotation, hubs on said spindles, bell cranks pivoted on said hubs, a cam associated with each of said spindles engaging one of the arms of the bell cranks for controlling the position of the other arm thereof, the other of said arms of the bell cranks passing between said spindles alternately from each hub to project beyond the center therebetween to sinuously form wire which is progressively advanced as the spindles rotate.

2. A machine for bending wire into sinuous form, embodying a plurality of bell cranks rotated about spaced centers, cams for engaging one arm of the bell crank for controlling the position of the other arm, said other arm advancing alternately between and beyond the medial line between said centers for forming the wire as it is drawn therebetween.

3. A machine for bending wire into sinuous form, embodying a plurality of bell cranks rotated about spaced centers, cams for engaging one arm of the bell cranks for controlling the position of the other arm thereof, said other arms advancing alternately between and beyond the medial line between said centers for forming the wire as it is drawn therebetween, and additional means operating in synchronism with the cams for engaging and moving the bell crank arm.

4. A machine for bending wire into sinuous form embodying a plurality of bell cranks rotated about spaced centers, cams for engaging one arm of the bell crank for controlling the position of the other arm, said other arm advancing alternately between and beyond the medial line between said centers for forming the wire as it is drawn therebetween, a cut-off and end-forming mechanism through which said sinuously formed wire passes and means for operating said cut-off and end-forming mechanism periodically for cutting said formed wire into sections and bending the ends thereof into desired shape.

5. A machine for bending wire into sinuous form embodying a plurality of bell cranks rotated about spaced centers, cams for engaging one arm of the bell crank for controlling the position of the other arm, said other arm advancing alternately between and beyond the medial line between said centers for forming the wire as it is drawn therebetween, a cut-off and end-forming mechanism through which said sinuously formed wire passes, means for operating said cut-off end-forming mechanism periodically for cutting said formed wire into sections and bending the ends thereof into desired shape, and means for adjusting said cutting and end-forming mechanism for regulating the length of section severed thereby.

6. In a machine for bending wire into a sinuous form, including in combination, a plurality of bell cranks revolvable about spaced centers, cams for engaging one arm of the bell cranks for controlling the position of the other arm thereof as the cranks revolve to move the last said arms alternately between and beyond the medial line between said centers, and projections on the last said arms which have the dual function of moving the wire about the projection pin of an adjacent arm and then remaining substantially stationary as the projection of another arm bends the wire thereabout.

7. A machine for bending a wire into sinuous form, including, in combination, a plurality of arms movable across a medial line disposed therebetween, projections carried by said arms which function to bend the wire about a projection of an adjacent arm and which thereafter is available to have the wire bent thereabout by a projection of a following arm to thereby sinuously form the wire.

8. A machine for bending a wire into sinuous form, including, in combination, a plurality of arms movable across a medial line disposed therebetween, projections carried by said arms which function to bend the wire about a projection of an adjacent arm and which thereafter is available to have the wire bent thereabout by a projection of a following arm to thereby sinuously form the wire, said wire being bent around a projection to a degree to have the adjacent sides of a convolution move beyond parallel relation to each other.

9. In a machine for bending wire into sinuous form, a device in said machine for rolling said sinuously formed wire to provide a set therein on an arc of predetermined diameter including a sprocket for engaging said formed wire, a second sprocket for engaging said formed wire spaced from said first sprocket and driven in timed relation thereto, and means for relatively adjusting said sprockets whereby said formed wire may be stretched between said sprockets to provide a predetermined number of convolutions within a desired length.

10. In a machine for bending wire into sinuous form, a device in said machine for rolling said sinuously formed wire to provide a set therein on an arc of predetermined diameter, means for severing said sinuously formed wire into sections, a sprocket engaging said formed wire driven in timed relation to said severing means, a sprocket on said rolling device for engaging said formed wire driven in timed relation to said first sprocket, and means for relatively adjusting said sprockets for stretching said formed wire between said sprockets a desired amount to produce a required length to said section.

11. In a machine for dividing sinuously formed wire into sections and bending the ends thereof, the combination of a die set comprising a pair of relatively movable die members for receiving sinuously formed wire and in a single operation severing the same into sections and laterally bending the adjacent ends of each section, one member of said die set having fixed thereon a projecting cutting blade, projecting wire bending means fixed on said one member and engageable with the adjacent ends of both sections of the formed wire, the other member of said die set having a cutting edge for cooperating with the projecting cutting blade, and anvil members carried by said die set for holding said wire sections adjacent their ends during the operation of said bending means.

12. In a machine for dividing sinuously formed wire into sections and bending the ends thereof, the combination of a die set comprising a pair of relatively movable die members for receiving sinuously formed wire and in a single operation severing the same into sections and laterally bending the adjacent ends of each section, one member of said die set having fixed thereon a projecting cutting blade, projecting a wire bending means fixed on said one member and engageable between the straight wire sections at the adjacent ends of both sections of the formed wire, the other member of said die set having a cutting edge for cooperating with the projecting cutting blade, and anvil members carried by said one die member for engaging the opposite sides of said straight wire sections and holding the same against movement in the plane of the formed wire during the operation of said bending means.

13. In a machine for producing sinuously formed wire and cutting it into sections, the combination of means for continuously bending wire into sinuous form and discharging the formed wire, a die set comprising a pair of relatively movable die members for receiving said sinuously formed wire discharged by said means and in a single operation severing the same into sections and laterally bending the adjacent ends of each section, one member of said die set having fixed thereon a projecting cutting blade, projecting wire bending means fixed on said one member and engageable with the adjacent ends of both sections of the formed wire, the other member of said die set having a cutting edge for cooperating with the projecting cutting blade, anvil members carried by said die set for holding said wire sections adjacent their ends during the operation of said bending means, and means for operating said first mentioned means and said die members in timed relation.

14. In a machine for producing sinuously formed wire and cutting it into sections, the combination of means for continuously bending wire into sinuous form with a plurality of straight transverse sections connected at their ends by arcuate sections and discharging the formed wire, a die set comprising a pair of relatively movable die members for receiving said sinuously formed wire discharged by said means and in a single operation severing the same into sections and laterally bending the adjacent ends of each section, one member of said die set having fixed thereon a projecting cutting blade, projecting wire bending means fixed on said one member and engageable between the straight wire sections at the adjacent ends of both sections of the formed wire, the other member of said die set having a cutting edge for cooperating with the projecting cutting blade, anvil members carried by said one die member for engaging the opposite sides of said straight wire sections and holding the same against movement in the plane of the formed wire during the operation of said bending means, and means for operating said first mentioned means and said die members in timed relation.

15. In a machine for dividing sinuously formed wire into sections and bending the ends thereof, the combination of means including a roller for receiving the sinuously formed wire and rolling said formed wire longitudinally to provide a set therein on an arc of predetermined diameter and discharging the rolled wire, a die set comprising a pair of relatively movable die members for receiving the sinuously formed wire discharged by said means and in a single operation severing the same into sections and laterally bending the adjacent ends of each section, one member of said die set having fixed thereon a projecting cutting blade, projecting wire bending means fixed on said one member and engageable with the adjacent ends of both sections of the formed wire, the other member of said die set having a cutting edge for cooperating with the projecting cutting blade, and anvil members carried by said die set for holding said wire sections adjacent their ends during the operation of said bending means, and means for operating said first means and said die set in timed relation.

16. In a machine for dividing sinuously formed wire into sections and bending the ends thereof, the combination of means including a roller for receiving the sinuously formed wire and rolling said formed wire longitudinally to provide a set therein on an arc of predetermined diameter and discharging the rolled wire, a die set comprising a pair of relatively movable die members for receiving the sinuously formed wire discharged by said means and in a single operation severing the same into sections and laterally bending the adjacent ends of each section, one member of said die set having fixed thereon a projecting cutting blade, projecting wire bending means fixed on said one member and engageable between the straight wire sections at the adjacent ends of both sections of the formed wire, the other member of said die set having a cutting edge for cooperating with the projecting cutting blade, and anvil members carried by said one die member for engaging the opposite sides of said straight wire sections and holding the same against movement in the plane of the formed wire during the operation of said bending means, and means for operating said first means and said die set in timed relation.

17. In a machine for producing sinuously formed wire and cutting it into sections, the combination of means for continuously bending wire into sinuous form and discharging the formed wire, means including a roller for receiving the sinuously formed wire discharged by said means and rolling said formed wire longitudinally to provide a set therein on an arc of predetermined diameter and discharging the rolled wire, a die set comprising a pair of relatively movable die members for receiving said sinuously formed wire discharged by said rolling means and in a single operation severing the same into sections and laterally bending the adjacent ends of each section, one member of said die set having fixed thereon a projecting cutting blade, projecting wire bending means fixed on said one member and engageable with the adjacent ends of both sections of the formed wire, the other member of said die set having a cutting edge for cooperating with the projecting cutting blade, anvil members carried by said die set for holding said wire sections adjacent their ends during the operation of said bending means, and means for operating said first mentioned means, said rolling means and said die members in timed relation.

18. In a machine for producing sinuously formed wire and cutting it into sections, the combination of means for continuously bending wire into sinuous form with a plurality of straight transverse sections connected at their ends by arcuate sections and discharging the formed wire, means including a roller for receiving the sinuously formed wire discharged by said means and rolling said formed wire longitudinally to provide a set therein on an arc of predetermined diameter and discharging the rolled wire, a die set comprising a pair of relatively movable die members for receiving said sinuously formed wire discharged by said rolling means and in a single operation severing the same into sections and laterally bending the adjacent ends of each section, one member of said die set having fixed thereon a projecting cutting blade, a wire bending projection means fixed on said one member and engageable between the straight wire sections at the adjacent ends of both sections of the formed wire, the other member of said die set having a cutting edge for cooperating with the projecting cutting blade, anvil members carried by said one die member for engaging the opposite sides of said straight wire sections and holding the same against movement in the plane of the formed wire during the operation of said bending projection, and means for operating said first mentioned means, said rolling means and said die members in timed relation.

19. In a machine for severing sinuously formed wire of the class described into sections of predetermined length and in the same operation laterally bending the adjacent severed ends of the wire, the combination of relatively movable die members, a wire cutting projection on one die member, wire bending projections on said one die member for engaging opposite sides of each of the adjacent severed ends of said wire and bending the same laterally, a cutting edge on the other die member for cooperating with said wire cutting projection for severing a section from the sinuously formed wire, said other die member having guide openings for receiving and guiding said wire bending projections and having a surface for supporting said wire during said cutting and bending operation.

20. In a machine for severing sinuously formed wire of the class described into sections of predetermined length and in the same operation laterally bending the adjacent severed ends of the wire, the combination of relatively movable die members, a wire cutting projection on one die member, wire bending projections on said one die member for engaging opposite sides of each of the adjacent severed ends of said wire and bending the same laterally, a cutting edge on the other die member for cooperating with said wire cutting projection for severing a section from the sinuously formed wire, said other die member having guide openings for receiving and guiding said wire bending projections and having a surface for supporting said wire during said cutting and bending operation, and coordinately operated and timed means for feeding said sinuously formed wire to said die members and for controlling the intermittent movement of said die members relative to each other to perform said cutting and bending operation after a predetermined length of the sinuously formed wire has been fed past said die members.

21. In a machine for severing sinuously formed wire of the class described into sections of predetermined length and in the same operation laterally bending the adjacent severed ends of the wire, the combination of relatively movable die members, a wire cutting projection on one of said members, wire bending projections on said one die member for engaging opposite sides of each of the adjacent severed ends of said wire, said projections embodying oppositely acting wedge portions which pass between the severed ends and bend the ends laterally about the projecting portions on the outer sides of the wire ends during the relative movement of the die members, a cutting edge on the other die member for cooperating with said wire cutting projection for severing a section from the sinuously formed wire, said other die member having guide openings for receiving and guiding said wire bending projections and having a surface for supporting said wire during said cutting and bending operation.

22. In a machine of the class described for continuously bending wire into sinuous form, the combination of intermittently actuated relatively movable die members operated and controlled in timed relation by and with the bending machine for receiving said sinuously formed wire and in each operation severing a section of predetermined length from the same and laterally bending the adjacent severed ends of the wire, a wire cutting projection on the movable die member, wire bending projections on said movable die member for engaging opposite sides of each of the adjacent severed ends and bending the same laterally, and a cutting edge on the stationary die member cooperating with the wire cutting projection for severing a section from the sinuously formed wire.

23. In a machine of the class described for continuously bending wire into sinuous form, the combination of intermittently actuated relatively movable die members operated and controlled in timed relation by and with the bending machine for receiving said sinuously formed wire and in each operation severing a section of predetermined length from the same and laterally bending the adjacent severed ends of the wire, a wire cutting projection on the movable die member, wire bending projections on said movable die member for engaging opposite sides of each of the adjacent severed ends and bending the same laterally, and a cutting edge on the stationary die member cooperating with the wire cutting projections for severing a section from the sinuously formed wire, said stationary die member having guide openings for receiving and guiding said wire bending projections and having a surface for supporting said wire during said cutting and bending operation.

24. In a machine of the class described for continuously bending wire into sinuous form, the combination of intermittently actuated relatively movable die members operated and controlled in timed relation by and with the bending machine for receiving said sinuously formed wire and in each operation severing a section of predetermined length from the same and laterally bending the adjacent severed ends of the wire, a wire cutting projection on the movable die member, wire bending projections on said movable die member for engaging opposite sides of each of the adjacent severed ends and bending the same laterally, and a cutting edge on the stationary die member cooperating with the wire cutting projections for severing a section from the sinuously formed wire, said stationary die member having guide openings for receiving and guiding said wire bending projections and having a surface for supporting said wire during said cutting and bending operation and having retaining channels on opposite sides thereof for guiding and retaining said sinuously formed wire during the movement therethrough and the engagement with said cutting and bending projections.

FRANK J. HORTON.

REFERENCES CITED

The following references are of record in the file of this patent:

UNITED STATES PATENTS

| Number | Name | Date |
|---|---|---|
| 261,977 | Adt | Aug. 1, 1882 |
| 365,121 | Doolittle | June 21, 1887 |

(Other references on following page)

| Number | Name | Date |
|---|---|---|
| 456,533 | Bold | July 21, 1891 |
| 488,941 | Koss | Dec. 27, 1892 |
| 626,183 | Martin | May 30, 1899 |
| 641,190 | Canfield | Jan. 9, 1900 |
| 651,200 | McBride | June 5, 1900 |
| 717,649 | Willson | Jan. 6, 1903 |
| 999,476 | Willmorth | Aug. 1, 1911 |
| 1,175,517 | Gibbs | Mar. 14, 1916 |
| 1,313,509 | Vincent | Aug. 19, 1919 |
| 1,387,934 | Monteith | Aug. 16, 1921 |
| 1,484,600 | Witte | Feb. 19, 1924 |

| Number | Name | Date |
|---|---|---|
| 1,558,526 | Witte | Oct. 27, 1925 |
| 1,919,999 | Borton | July 25, 1933 |
| 2,002,399 | Kaden | May 21, 1935 |
| 2,085,570 | Blount | June 29, 1937 |
| 2,188,406 | Horton | Jan. 30, 1940 |

FOREIGN PATENTS

| Number | Country | Date |
|---|---|---|
| 21,979 | Great Britain | Dec. 1, 1892 |
| 275,319 | Germany | June 13, 1914 |

Certificate of Correction

Reissue No. 23,169 November 22, 1949

FRANK J. HORTON

It is hereby certified that errors appear in the printed specification of the above numbered patent requiring correction as follows:

Column 1, line 21, for "performing" read *preforming*; column 10, line 73, before the word "wire" strike out "a"; column 12, line 74, before "fixed" strike out "means"; and that the said Letters Patent should be read with these corrections therein that the same may conform to the record of the case in the Patent Office.

Signed and sealed this 21st day of March, A. D. 1950.

[SEAL]

THOMAS F. MURPHY,
*Assistant Commissioner of Patents.*